United States Patent
Luethi et al.

(10) Patent No.: US 6,870,071 B2
(45) Date of Patent: Mar. 22, 2005

(54) PROCESSES FOR PREPARING ALKALI METAL ALKOXIDE GRANULES AND ALKALINE EARTH METAL ALKOXIDE GRANULES

(75) Inventors: Joachim Luethi, Koenigswinter (DE); Stefan Schulze, Grosskrotzenburg (DE); Christian Alt, Gelnhausen (DE); Andreas Goelz, Rodenbach (DE); Andreas Harthun, Moembris (DE)

(73) Assignee: Degussa AG, Duesseldorf (DE)

( * ) Notice: Subject to any disclaimer, the term of this patent is extended or adjusted under 35 U.S.C. 154(b) by 11 days.

(21) Appl. No.: 10/270,113

(22) Filed: Oct. 15, 2002

(65) Prior Publication Data

US 2003/0088994 A1 May 15, 2003

(30) Foreign Application Priority Data

Oct. 15, 2001 (DE) ......................................... 101 50 326

(51) Int. Cl.[7] ............................. C07C 31/30; F26B 3/08
(52) U.S. Cl. ......................... 568/851; 568/840; 34/359; 34/372; 34/373
(58) Field of Search ................................ 568/840, 851; 34/359, 372, 373

(56) References Cited

U.S. PATENT DOCUMENTS

| 3,907,877 A | 9/1975 | Tedball |
| 4,946,653 A | 8/1990 | Stopp et al. |
| 4,946,654 A | 8/1990 | Uhlemann et al. |

FOREIGN PATENT DOCUMENTS

| EP | 0 600 282 | 6/1994 |

OTHER PUBLICATIONS

U.S. patent application Ser. No. 10/270,116, Alt et al., Oct. 15, 2002.
U.S. patent application Ser. No. 10/270,113, Luethi et al., Oct. 15, 2002.
U.S. patent application Ser. No. 10/270,114, Harthun et al., Oct. 15, 2002.
H. Uhlemann, Chemie. Ingenieur. Technik, vol. 62, No. 10, XP–000176381, pp. 822–834, "Kontinuierliche Wirbelschicht–Spruehgranulation", 1990.

*Primary Examiner*—Elvis O. Price

(57) ABSTRACT

Processes for preparing alkali metal alkoxide granules and alkaline earth metal alkoxide granules of aliphatic, saturated or unsaturated, unbranched or branched alcohols, preferably having 1 to 12, in particular 1 to 6, carbon atoms. A preferred process for preparing the alkoxides utilizes fluidized-bed spray granulation.

23 Claims, 2 Drawing Sheets

Fluidized-bed spray granulation of alkoxides in throughflow mode

PROCESSES FOR PREPARING ALKALI METAL ALKOXIDE GRANULES AND ALKALINE EARTH METAL ALKOXIDE GRANULES

BACKGROUND OF THE INVENTION

1. Field of the Invention

The present invention relates to processes for preparing the alkali metal alkoxide granules and alkaline earth metal alkoxide granules of aliphatic, saturated or unsaturated, unbranched or branched alcohols having 1 to 12, in particular 1 to 6, carbon atoms. A preferred process for preparing said alkoxides uses fluidized-bed spray granulation.

2. Description of the Background

The preparation of granular sodium benzoate which is produced from sodium alkoxide solution and phenol in toluene is known (U.S. Pat. No. 3,907,877).

However, alkali metal alkoxide and alkaline earth metal alkoxide solids, starting from aliphatic alcohols, have to date only been synthesizable in powder form. From this powder form, considerable hazard potential results on handling these alkoxides, since they are corrosive in this powder form, and in the atmosphere are readily flammable and chemically highly reactive. This imposes high engineering and safety demands on handling such substances.

SUMMARY OF THE INVENTION

It is therefore an object to provide processes which permit alkali metal alkoxides and alkaline earth metal alkoxides of aliphatic alcohols having 1 to 12, in particular 1 to 6, carbon atoms to be provided in granular form, avoiding said disadvantages of the pulverulent embodiments.

It has now been found that, under special conditions, granular alkali metal alkoxides and/or alkaline earth metal alkoxides may be prepared.

The invention provides processes for preparing alkali metal alkoxide granules and alkaline earth metal alkoxide granules, the process used preferably being fluidized-bed spray granulation.

In this embodiment, the present invention provides:

A process for preparing alkali metal alkoxide granules or alkaline earth metal alkoxide granules, comprising spraying a solution or dispersion of an alkali metal alkoxide or an alkaline earth metal alkoxide into a fluidized bed.

A more complete appreciation of the invention and many of the attendant advantages thereof will be readily obtained as the same becomes better understood by reference to the following Figures in conjunction with the detailed description below.

DETAILED DESCRIPTION OF THE INVENTION

Figure 1:
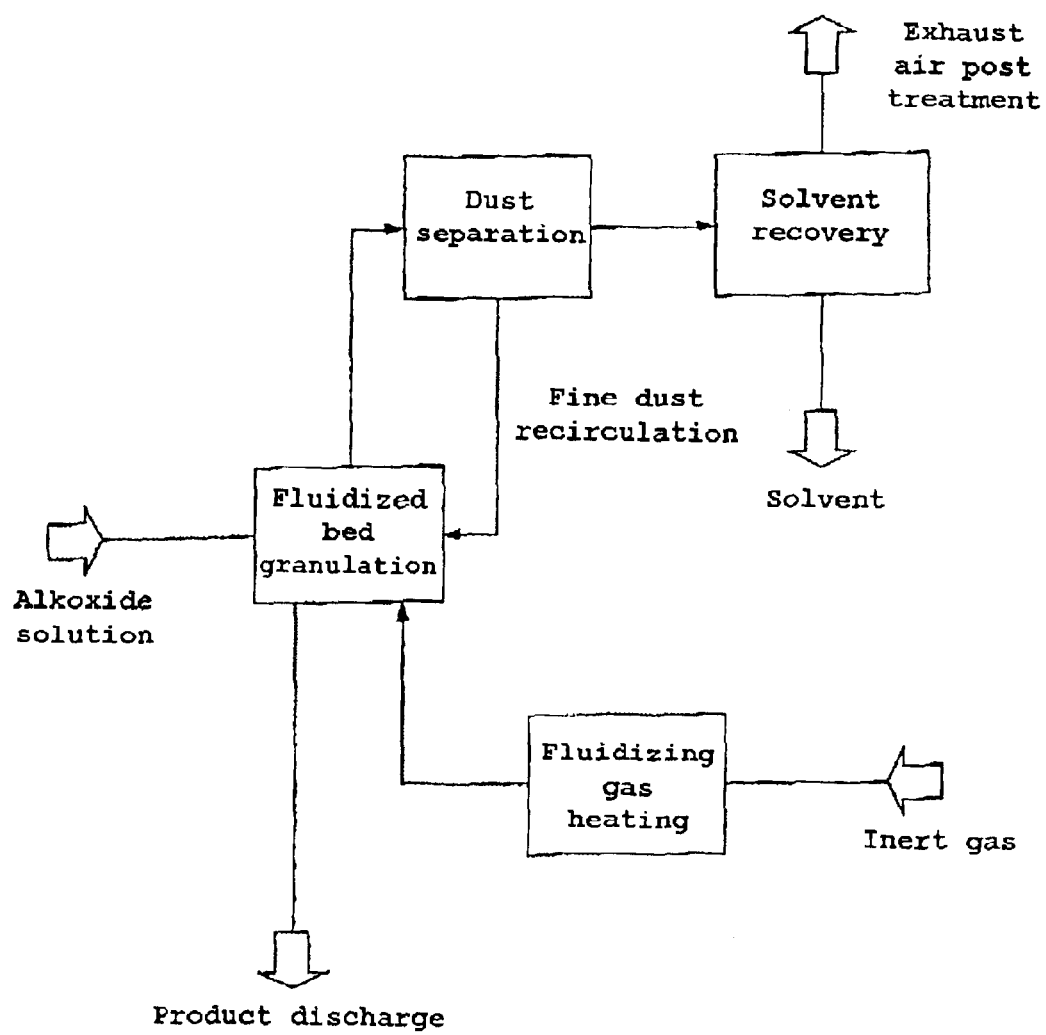
FIG. 1: embodiment of the present invention for fluidized-bed spray granulation of alkoxides in throughflow mode.
Figure 2:
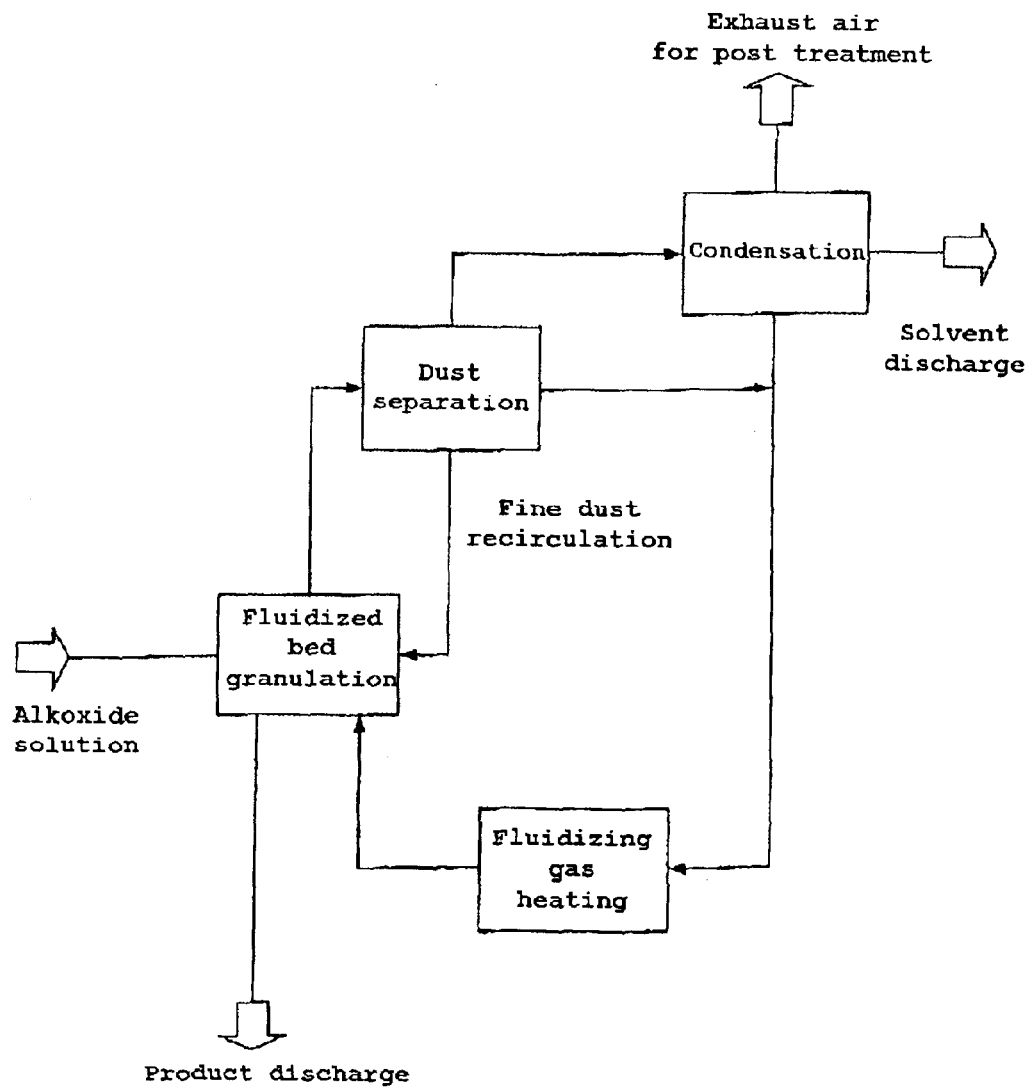
FIG. 2: embodiment of the present invention for fluidized-bed spray granulation of alkoxides with gas recirculation.

Typically, in fluidized-bed spray granulation, solutions or dispersions are sprayed into a fluidized bed. The liquid fractions present are vaporized by a stream of heat transfer gas. The solids fractions adhere to material already present in the fluidized bed and cause an increase in granule diameter. Depending on the product to be granulated, the particle size of the granules is controlled and reproduced by selection of the specific process parameters. The heat transfer medium can in this case be a heated inert gas or sufficiently hot steam. The heat transfer medium is passed through the granulation fluidized bed either single pass (FIG. 1) or up to complete gas recirculation (FIG. 2). Gas recirculation which is as complete as possible with ejection of excess solvent and inert gases is a target for economic aspects.

Liquid constituents of the solutions or dispersions used which are vaporized in the fluidized bed can be condensed and recovered. This alternative is to be preferred for environmental and economic aspects.

The solution or dispersion is sprayed with nozzles through which one or more substances are passed simultaneously. In the case of a single-component nozzle, only the pressurized solution or dispersion of the substance to be granulated is sprayed. If, in contrast, multicomponent nozzles are used, preferably two-component, three-component or four-component nozzles, in addition to the solution or dispersion, atomizer gas(es) and nozzle cleaning gas(es) are sprayed. The technical design of the nozzles or the spraying device in the fluidized bed space can in principle be chosen freely and is product-dependent. The maximum number of substances which can be passed through a nozzle is in no way to be limiting for preparation of the inventive alkoxide granules.

A granule substream is taken off continuously or batchwise from the granulation fluidized bed, if appropriate cooled and, as required, stored or packaged under a protective gas atmosphere. Granulation can also be carried out batchwise, but this is not to be favored for economic aspects.

The fluidizing gas, downstream of the fluidized bed, entrains very fine dust fractions, which are suitably separated, which can be achieved, for example, by filters or cyclones. Dust can be substantially removed above the fluidized bed in the fluidized-bed spray granulator itself or outside the spray granulator in a suitable external separator.

If dust filters are used for this task, then, to clean the filter elements, inert gases, in particular nitrogen or the circulation gas itself, can be used. Very fine dusts are expediently recirculated to the fluidized bed.

The spray granulation process for preparing the alkali metal alkoxide granules and alkaline earth metal alkoxide granules may be performed in principle at superatmospheric pressure, atmospheric pressure or reduced pressure. An expedient processing pressure range is achieved when granules conforming to specifications are produced at maximum capacity with the fluidizing gas at the maximum permissible system temperature. The fluidized-bed temperature is preferably set in a variable manner by the processing pressure selected. Preferably, a low process overpressure with respect to atmosphere is set.

The fluidizing gas heaters can be operated electrically, with steam or with heat transfer media. For economic operation of the fluidized-bed spray granulation system, series connection of abovementioned gas heater types can be expedient.

In the process employed according to the invention for granulating the alkali metal alkoxides and alkaline earth metal alkoxides, preferably, the alcoholic solutions of the alkoxides are used. However, in principle, dispersions of the alkoxides in alternative solvents or nonalcoholic alkoxide solutions can also be used. As an example which is in no way limiting, the solution of potassium tert-butoxide in tetrahydrofuran may be mentioned.

The gas used for the fluidization can be an inert gas, but preferably also the vaporized solvent in which the alkoxide is dissolved or dispersed.

The fluidized-bed temperature is preferably set by an inert gas or by superheated solvent vapors or by a mixture of the two.

The bed temperature must be selected so that it is below the melting temperature of the relevant alkoxide.

The fluidized-bed temperature is preferably selected in such a manner that the alkoxide content of the granules is greater than the alkoxide content of the solution or dispersion used.

The alcohol content of the solution or dispersion is, before the granulation, generally less than 90%, preferably less than 50%, in particular 20 to 40%.

The alkoxide content of the granules is 50–100% by weight, preferably 19–99% by weight, in particular >98% by weight. The drying can be carried out directly in the granulation fluidized bed or in a downstream dryer. Downstream drying is to be used advantageously in particular when the alkoxide content of the granules produced in the granulation is <98%, in particular <90%.

The fluidizing gas passed through the fluidized bed can be 0% to 100% recirculated back to the fluidized bed with supply of heat.

As noted above, the alkoxide group may have 1 to 12 carbon atoms. This range includes all specific values and subranges therebetween, such as 2, 3, 4, 5, 6, 7, 8, 9, 10, and 11 carbon atoms.

EXAMPLES

Having generally described this invention, a further understanding can be obtained by reference to certain specific examples which are provided herein for purposes of illustration only and are not intended to be limiting unless otherwise specified.

The examples below for the preparation of sodium methoxide granules, sodium ethoxide granules, potassium methoxide granules and potassium ethoxide granules have only the character of examples and are not to limit in any way the applicability of the fluidized-bed spray granulation process to these alkoxides. In addition, the processing parameters, depending on the heating power and pressure conditions, can be varied within broad ranges. The temperatures specified may be lowered naturally if the processing pressure is reduced, or increased if the processing pressure is increased. For reasons of plant safety, it can be expedient to set the system pressure above atmospheric pressure.

Example 1
Preparation of Sodium Methoxide Granules (nm) Using a Two-component Nozzle:

A methanolic sodium methoxide solution (30% by weight alkoxide content) is sprayed via a two-component nozzle into a fluidized bed consisting of sodium methoxide solids. The propellant gas used is nitrogen. The fluidized bed is heated to 70° C.–95° C., by passing hot nitrogen at approximately 150° C.–250° C. through the fluidized bed. The nitrogen is heated with an electric gas heater. Sodium methoxide granules (NM content >98% by weight) are continuously removed from the fluidized bed. The operating overpressure is 10 mbar–100 mbar. The excess methanol and the excess nitrogen are passed through a condensation system, methanol being condensed and recovered.

Example 2
Preparation of Sodium Methoxide Granules (NM) Using a Single-component Nozzle:

A methanolic sodium methoxide solution (30% by weight alkoxide content) is sprayed via a single-component nozzle into a fluidized bed consisting of sodium methoxide solids. The fluidized bed is heated to 70° C.–135° C. by passing hot methanol vapor at approximately 250° C.–350° C. through the fluidized bed. The fluidizing gas is heated by an electrical gas heater. Sodium methoxide granules (NM content >98% by weight) are continuously taken off from the fluidized bed). The operating overpressure is 10 mbar–100 mbar. The excess methanol is passed through a condensation system, methanol being condensed and recovered.

Example 3
Preparation of Sodium Ethoxide Granules (NE) Using a Single-component Nozzle:

An ethanolic sodium ethoxide solution (21% by weight alkoxide content) is sprayed via a single-component nozzle into a fluidized bed consisting of sodium ethoxide solids. The fluidized bed is heated to 70° C.–135° C., by passing hot ethanol vapor at approximately 250° C.–350° C. through the fluidized bed. The fluidizing gas is heated by an electrical gas heater. Sodium ethoxide granules (NE content >98% by weight) are continuously taken off from the fluidized bed. The operating overpressure is 10 mbar–100 mbar. The excess ethanol is passed through a condensation system, ethanol being condensed and recovered.

Example 4
Preparation of Potassium Methoxide Granules (KM) Using a Single-component Nozzle:

A methanolic potassium methoxide solution (32% by weight alkoxide content) is sprayed via a single-component nozzle into a fluidized bed consisting of potassium methoxide solids. The fluidized bed is heated to 150° C.–250° C. by passing hot methanol vapor at approximately 300° C.–350° C. through the fluidized bed. The fluidizing gas is heated by an electrical gas heater. Potassium methoxide granules (KM content >98% by weight) are continuously taken off from the fluidized bed. The operating overpressure is 10 mbar–100 mbar. The excess methanol is passed through a condensation system, methanol being condensed and recovered.

Example 5
Preparation of Potassium Ethoxide Granules Using a Single-component Nozzle:

An ethanolic potassium ethoxide solution (24% by weight alkoxide content) is sprayed via a single-component nozzle into a fluidized bed consisting of potassium ethoxide solids. The fluidized bed is heated to 150°–250° C. by passing hot ethanol vapor at approximately 300° C.–350° C. through the fluidized bed. The fluidizing gas is heated by an electrical gas heater. Potassium ethoxide granules (content >98% by weight) are taken off continuously from the fluidized bed. The operating overpressure is 10 mbar–100 mbar. The excess ethanol is passed through a condensation system, ethanol being condensed and recovered.

Obviously, numerous modifications and variations of the present invention are possible in light of the above teachings. It is therefore to be understood that within the scope of the appended claims, the invention may be practiced otherwise than as specifically described herein.

This application is based on German Patent Application Serial No. 101 50 326.1, filed on Oct. 15, 2001, and incorporated herein by reference.

What is claimed is:

1. A process for preparing alkali metal alkoxide granules or alkaline earth metal alkoxide granules, comprising spraying a solution or dispersion of an alkali metal alkoxide or an alkaline earth metal alkoxide into a fluidized bed.

2. The process of claim 1, in which a solution of an alkali metal alkoxide is sprayed into the fluidized bed.

3. The process of claim 1, in which a solution of an alkaline earth metal alkoxide is sprayed into the fluidized bed.

4. The process as claimed in claim 1, wherein the process is a process of fluidized-bed spray granulation.

5. The process as claimed in claim 1, wherein the fluidized-bed temperature is set in a variable manner by the process pressure selected.

6. The process as claimed in claim 1, wherein the process pressure is set at a superatmospheric pressure at a low process overpressure compared with atmospheric pressure.

7. The process as claimed in claim 4, wherein the fluidized-bed temperature is selected in such a manner that the alkoxide content of the granules prepared is greater than the alkoxide content of the solution or dispersion sprayed.

8. The process as claimed in claim 7, wherein the alkoxide content of the granules prepared is >98% by weight, the alkoxide being dried directly in the granulation fluidized bed.

9. The process as claimed in claim 4, wherein the alkoxide content of the granules which are obtained from the fluidized bed is <98% by weight and the alkoxide is dried downstream of the granulation.

10. The process as claimed in claim 1, wherein the fluidized-bed temperature is set by an inert gas or by superheated solvent vapors or by a mixture of the two.

11. The process as claimed in claim 10, wherein the vaporized solvent used as fluidizing gas are vapors of a solvent in which the alkoxide is dissolved or dispersed.

12. The process as claimed in claim 1, wherein the fluidized bed is fluidized by a fluidizing gas which is 0%–100% recirculated to the fluidized bed with supply of heat.

13. The process of claim 1, wherein the alkoxide has 1 to 12 carbon atoms.

14. The process of claim 1, wherein the alkoxide has 1 to 6 carbon atoms.

15. The process of claim 1, in which a solution of sodium methoxide or sodium ethoxide is sprayed into the fluidized bed.

16. The process of claim 1, in which a methanol solution of sodium methoxide is sprayed into the fluidized bed.

17. The process of claim 1, in which an ethanol solution of sodium ethoxide is sprayed into the fluidized bed.

18. The process of claim 4, wherein the alkoxide has 1 to 12 carbon atoms.

19. The process of claim 4, wherein the alkoxide has 1 to 6 carbon atoms.

20. The process of claim 4, in which a solution of sodium methoxide or sodium ethoxide is sprayed into the fluidized bed.

21. The process of claim 4, in which a methanol solution of sodium methoxide is sprayed into the fluidized bed.

22. The process of claim 4, in which an ethanol solution of sodium ethoxide is sprayed into the fluidized bed.

23. The process of claim 4, in which a solution of potassium methoxide or potassium ethoxide is sprayed into the fluidized bed.

* * * * *